United States Patent

Hung et al.

(10) Patent No.: US 8,077,228 B2
(45) Date of Patent: Dec. 13, 2011

(54) PROCESSING OF SENSOR VALUES IN IMAGING SYSTEMS

(75) Inventors: Szepo R. Hung, San Diego, CA (US); Hsiang-Tsun Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/710,681

(22) Filed: Feb. 23, 2010

(65) Prior Publication Data

US 2010/0182463 A1    Jul. 22, 2010

Related U.S. Application Data

(62) Division of application No. 11/377,086, filed on Mar. 15, 2006, now Pat. No. 7,667,747.

(51) Int. Cl.
*H04N 9/64* (2006.01)
*H04N 5/235* (2006.01)

(52) U.S. Cl. .................. 348/246; 348/222.1

(58) Field of Classification Search .......... 348/175, 348/222.1, 246, 247, 272–283
See application file for complete search history.

(56) References Cited

U.S. PATENT DOCUMENTS

| | | | |
|---|---|---|---|
| 7,283,164 B2 * | 10/2007 | Kakarala et al. | 348/246 |
| 7,302,091 B2 | 11/2007 | Hamaguchi et al. | |
| 7,542,082 B2 * | 6/2009 | Tajima et al. | 348/246 |
| 7,812,866 B2 * | 10/2010 | Sasaki | 348/241 |
| 7,969,488 B2 * | 6/2011 | Jerdev | 348/246 |
| 2002/0196354 A1 | 12/2002 | Chang et al. | |
| 2003/0063203 A1 * | 4/2003 | Ohno | 348/247 |
| 2003/0151682 A1 | 8/2003 | Kokubo et al. | |
| 2004/0051798 A1 | 3/2004 | Kakarala et al. | |
| 2004/0169746 A1 * | 9/2004 | Chen et al. | 348/246 |
| 2005/0286797 A1 | 12/2005 | Hayaishi | |
| 2006/0012694 A1 * | 1/2006 | Yoneda et al. | 348/246 |
| 2006/0125939 A1 | 6/2006 | Yoneda | |
| 2007/0091187 A1 * | 4/2007 | Lin | 348/246 |
| 2008/0239112 A1 | 10/2008 | Naito | |

FOREIGN PATENT DOCUMENTS

| | | |
|---|---|---|
| EP | 1594308 | 11/2005 |
| EP | 1605403 | 12/2005 |

OTHER PUBLICATIONS

International Search Report and Written Opinion—PCT/US2007/064096, International Search Authority—European Patent Office—Aug. 10, 2007.

* cited by examiner

*Primary Examiner* — Trung Diep
(74) *Attorney, Agent, or Firm* — Michael DeHaemer; James R. Gambale, Jr.

(57) ABSTRACT

A digital image system identifies defective pixels of a digital image sensor based on sensor values of pixels positioned in at least two dimensions on the digital image sensor. The exemplary imaging system includes a buffer for receiving sensor values that are each associated with a pixel in the digital image sensor and electronics for comparing the sensor value associated with a test pixel to the sensor values of pixels positioned in at least two dimensions on the digital image sensor. The electronics determines whether the test pixel is a defective pixel based on the comparison.

17 Claims, 7 Drawing Sheets

PROCESSING OF SENSOR VALUES IN IMAGING SYSTEMS

RELATED APPLICATIONS

Claim of Priority Under 35 U.S.C. §120

The present application for patent is a divisional of patent application Ser. No. 11/377,086 entitled "PROCESSING OF SENSOR VALUES IN IMAGING SYSTEMS" filed Mar. 15, 2006, pending, and assigned to the assignee hereof.

BACKGROUND

1. Field

The present invention relates to imaging systems and more particularly to processing sensor values in imaging systems.

2. Background

Electronic imaging systems such as digital cameras have an image sensor that contains an array of light sensors arranged in a pattern. For instance, an image sensor may include a two dimensional array of photo-detectors arranged in columns and rows. Each photo-detector is associated with a pixel in the image sensor. The photo-detectors each generate a signal indicating the intensity of light incident on the associated pixel.

A portion of the pixels in an image sensor are usually bad or defective. One method of correcting for these defective pixels determines the location of the defective pixels during the manufacturing process and stores these locations in a non-volatile memory. The pixels stored in the memory as defective pixels are then corrected at run time. However, this Bad Pixel Compensation (BPC) technique adds additional labor and production time to the manufacturing process. Additionally, this BPC technique does not compensate for the behavior of the pixels in response to imaging conditions such as sensor gain, exposure time, and operating condition.

As a result, there is a need for an effective method of detecting and correcting defective pixels.

SUMMARY

A digital image system identifies defective pixels of a digital image sensor based on sensor values of pixels positioned in at least two dimensions on the digital image sensor. The exemplary imaging system includes a buffer for receiving sensor values that are each associated with a pixel in the digital image sensor and electronics for comparing the sensor value associated with a test pixel to the sensor values of pixels positioned in at least two dimensions on the digital image sensor. The electronics determines whether the test pixel is a defective pixel based on the comparison.

An imaging system generates a corrected sensor value associated with a defective pixel of an image sensor based on a plurality of sensor values selected from a group of sensor values associated with pixels spatially positioned in at least two dimensions on the image sensor. Sensor values are received at a buffer where each sensor value is associated with a pixel in a digital image sensor. At least one of the sensor values is associated with a defective pixel. The plurality of sensor values are selected from among a group of sensor values associated with pixels spatially positioned in at least two dimensions on the digital image sensor. A corrected sensor value associated with the defective pixel is generated such that the corrected sensor value is a function of the selected sensor values.

DETAILED DESCRIPTION

Figure 1:
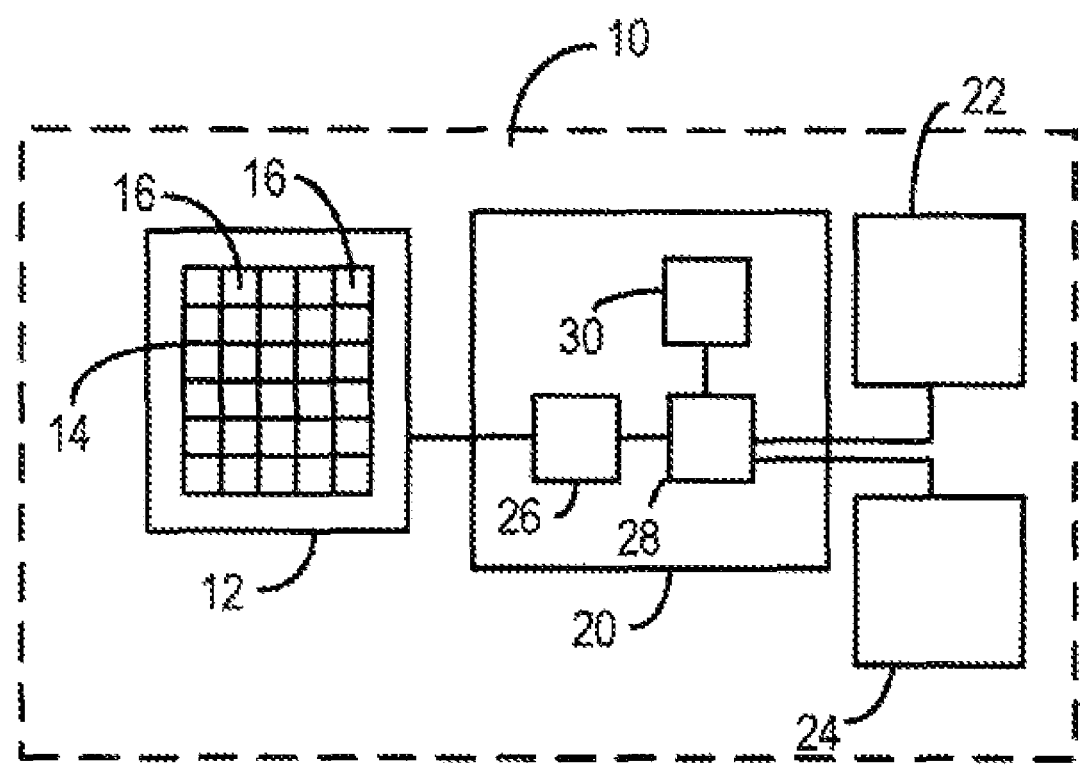
FIG. 1 is a block diagram of an imaging system in accordance with an exemplary embodiment.

In accordance with an exemplary embodiment, an imaging system includes an image sensor having a plurality of pixels that are each associated with a light sensor. The system includes electronics that receive sensor values from the light sensors and use these sensor values to identify the defective pixels. Since the defective pixels are identified after the sensor values are received, the system can overcome the challenges associated with identifying the defective pixels during the manufacturing process. For instance, the system can identify defective pixels at different times during operation of the system. As an example, the system can identify defective pixels each time sensor values are received, a fraction of the times sensor values are received, each time an image is processed or a fraction of the times that an image is processed. As a result, the selection of defective pixels that are identified may change during the operation of the system. Since the defective pixels are identified during the use of the system, the additional labor and production time associated with identifying the location of the defective pixels during the manufacturing process need not be incurred.

The imaging system can identify defective pixels by comparing the sensor value associated with a test pixel being examined with the sensor values associated with comparison pixels that are located in two dimensions on the image sensor rather than with pixels that are located in only one dimension on the image sensor. When the test pixel is in a region with large gradients in sensor values, considering only comparison pixels located in one dimension on the image sensor can yield false positives. However, considering comparison pixels located in two dimensions reduces the number of false positives. As a result, considering pixels located in two dimensions improves the accuracy of defective pixel identification.

The imaging system can identify defective pixels by comparing the sensor value associated with the test pixel with the sensor values associated with comparison pixels that are located up to two pixels away from the test pixel. A defective pixel can be located in a cluster of defective pixels. Defective pixel clusters are increasingly common as pixel sizes become smaller in image systems such as mobile phone cameras. For instance, dust particles can fall onto the image sensor and affect the responsiveness of the light sensors to incoming light. As the pixels become smaller, the dust speck can affect a larger number of pixels. Since the comparison pixels can be located up to two pixels away from the test pixel, the method of identifying defective pixels is still effective when the test pixel is located in a cluster of defective pixels up to two pixels by two pixels.

The electronics can also adjust one or more parameters that control the number of pixels that are identified as defective pixels. Using current technologies, a normal image will generally have less than 100 defective pixels. However, the number of defective pixels identified can increase under particular conditions. For instances, outdoor images such as sunlight through trees can have an increased number of pixels identified as defective pixels. The electronics can adjust one or more parameters to keep the number of defective pixels within a desired range.

Once the electronics have identified a defective pixel, the electronics can also perform a method of generating a corrected sensor value for the defective pixel. The method of generating the corrected sensor value for a defective pixel can take into consideration neighboring pixels located in two dimensions on the image sensor rather that defective pixels located in only one dimension on the image sensors. The defective pixel can be located in a region of an image with large gradients in sensor values such as at an edge of an item in the image. When this occurs, the gradient of sensor values can be very different in different directions. As a result, considering pixels in only one dimension when generating a corrected sensor value can provide vastly different results depending on which dimension is taken into consideration. However, considering the pixels located in two dimension permits the gradients in each direction to be taken into account and provides a corrected sensor value that more accurately reflects the sensor value that should be associated with the defective pixel.

FIG. 1 is a block diagram of an imaging system 10. The imaging system 10 includes an image sensor 12 having an array of pixels 14 that are each associated with a light sensor 16. In some instances, the pixels are arranged in two-dimensional array of columns and rows. Examples of image sensors include, but are not limited to, CMOS (Complimentary Metal Oxide Semiconductor) sensor chips and CCD (Charge Coupled Device) sensor chips.

The image sensor may be covered by a color filter array (CFA), such that each pixel senses a particular range of wavelengths of a particular color. For instance, the color filter array can be a Bayer color filter array. A Bayer color filter array has the colors arranged in the Bayer pattern where red pixels and blue pixels are each less dense than green pixels. The following example shows a portion a Bayer color filter array where "R" represents red, "B" represents blue, and "G" represents green:

R G R G R G
G B G B G B
R G R G R G
G B G B G B
R G R G R G.

The imaging system includes electronics 20 for receiving sensor values from the image sensor 12. The electronics 20 process the sensor values and output the results to one or more memories 22 for future storage and/or output the results to one or more output devices 24. The memory 22 can be any memory device or combination of memory devices suitable for write operations such as storing images and data. Suitable output devices 24 include, but are not limited to, computer systems, printers, transmitters, networks such as the Internet, and displays such as camera displays, video phone displays, video screens, and computer screens. Although the output devices 24 and/or memory 22 are shown as being part of the imaging system 10, the output devices 24 and/or memory 22 can be outside of the imaging system.

The electronics 22 include a buffer 26 and a processor 28. The buffer 26 is configured to store sensor values from the image sensor 12 until the required number of sensor values is present to begin processing. For instance, when determining whether the test pixel is a defective pixel, the processor 28 may need to consider sensor values for pixels that are up to two pixels away from the test pixel. As a result, when the pixels are arranged in a Bayer pattern, the processor 28 may require that the buffer store portions of at least five lines of sensor values before the processor processes the sensor values. In some instances, the processor 28 is in communication with a signal bearing medium 30 having a set of instructions to be executed by the processor. Although the signal bearing medium 30 is shown as being different from the memory 22, the signal bearing medium 30 can be the same as the memory 22.

A suitable processor 28 includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Suitable signal bearing media 30 include, but are not limited to, optical discs such as CDs, magnetic storage diskettes, Zip disks, magnetic tapes, RAMs, and ROMs. In some instances, the computer-readable medium 30 is located outside of the imaging system. For instance, the signal bearing medium can be connected to a server computer on a computer network. In some instances, the signal bearing medium 30 is not required.

Examples of suitable imaging systems 10 include, but are not limited to, digital cameras, video cameras, mobile camera phones, medical imaging devices. The imaging system can also be a computer system configured to store image data. Examples of suitable computer systems include, but are not limited to, a personal computers and servers. In some instances, the imaging system does not include the image sensor. For instance, when the imaging system is a computer system, the image sensor is not necessarily included in the imaging system. When the image sensor is not included in the imaging system, the image sensor can be independent from the imaging system but can be placed in communication with the imaging system to permit the electronics to receive the sensor values.

FIG. 2A through FIG. 2E are flow diagrams illustrating methods of processing sensor values for pixels in an image sensor. The discussion of the flow diagrams is accompanied by examples. Although the methods may be performed in any system or device, the methods are performed in the imaging system 10 in the exemplary embodiment. The examples refer to the portion of a Bayer pattern set forth below. In the Bayer pattern $R_j$ indicates a red pixel with indice j, $B_k$ indicates a blue pixel with indice k, and $G_m$ indicates a green pixel with indice m. The sensor values for each of the pixels are listed in a grid to the right of the Bayer pattern. The sensor value for pixels that are not employed in the following examples are shown as an "*." The position of the sensor value in the grid corresponds to a position in the Bayer pattern. Accordingly, the sensor $R_2$ has a sensor value of 151.

| | | | | | |
|---|---|---|---|---|---|
| $G_1 R_1 G_2 R_2 G_3 R_3$ | 202 | 473 | 81 | 151 | 90 | 47 |
| $B_1 G_4 B_2 G_5 B_3 G_6$ | * | 200 | * | 180 | * | * |
| $G_7 R_4 G_8 R_5 G_9 R_6$ | 162 | 454 | TP | TP | 83 | 39 |
| $B_4 G_{10} B_5 G_{11} B_6 G_{12}$ | * | 192 | * | 700 | * | * |
| $G_{13} R_7 G_{14} R_8 G_{15} R_{10}$ | 110 | 472 | 132 | 175 | 43 | 41 |

Figure 2A:
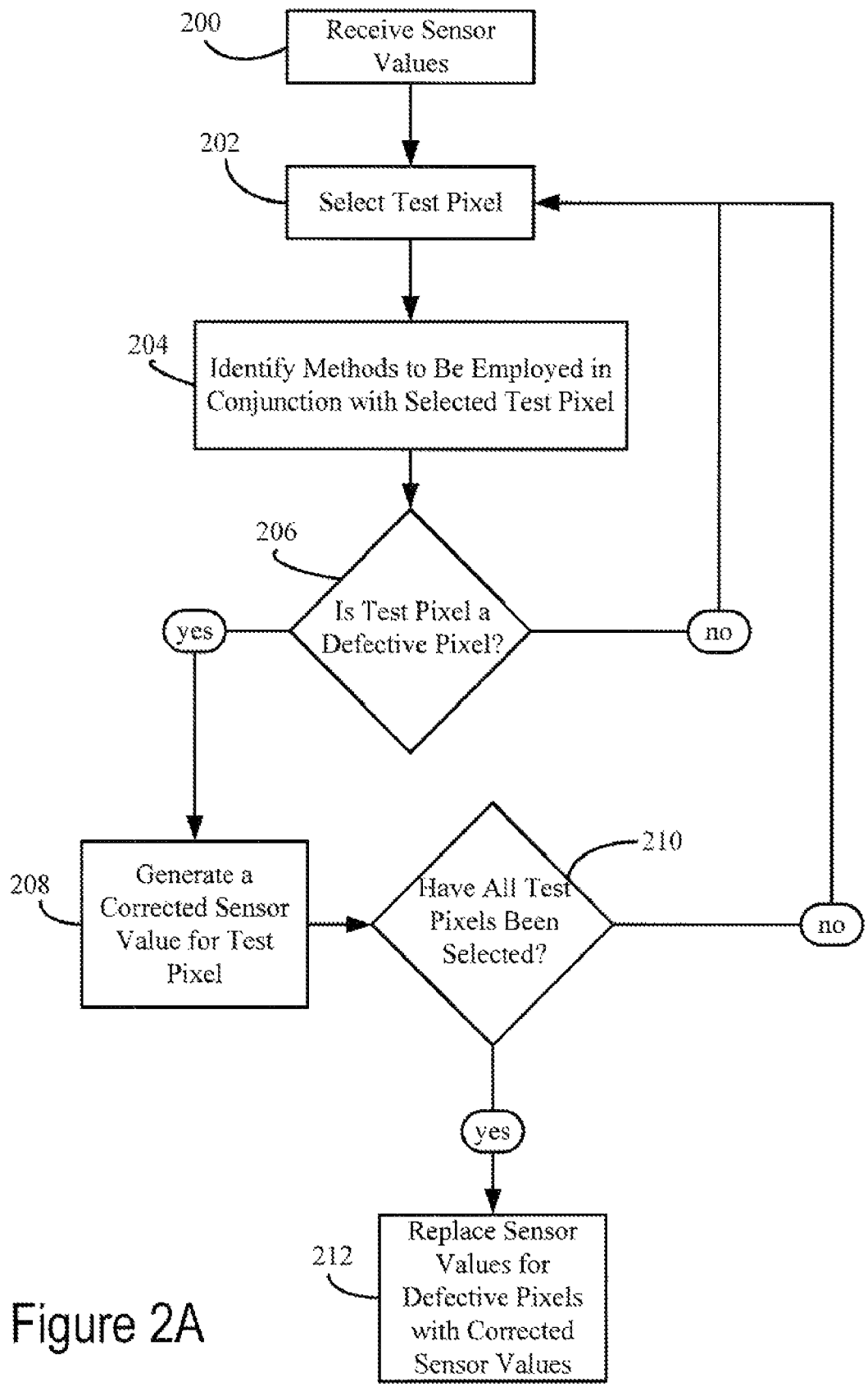
FIG. 2A is a flow diagram for an exemplary method of processing sensors value for pixels in an image sensor.

FIG. 2A is a flow diagram for a method of processing sensors value for pixels in an image sensor. In process block 200, the electronics receive sensor values generated by an image sensor. The number of sensor values needed to begin processing depends on the type of processing. For example, the sensor values are typically read off the image sensor one row at a time. In one embodiment, the electronics receive at least five rows of raw sensor values before the processor begins processing the sensor values.

At process block 202, the processor selects a test pixel. The test pixel is the pixel that will be considered by the processor to determine whether it is a defective pixel. At process block 204, the processor identifies the correct method(s) to be employed in conjunction with the test pixel. Since the density of different pixel colors is often different, different methods can be employed to process test pixels of different colors. For instance, in a Bayer pattern, green pixels are more dense than blue pixels or red pixels. As a result, a different method for identifying defective pixels may be employed when the test pixel is a green pixel than is employed when the test pixel is a red pixel or a blue pixel. Accordingly, when pixels are arranged in a Bayer pattern the processor can identify whether the test pixel is green before doing further process. In the event that the test pixel is green, the processor can do additional processing with the one or more methods associated with green pixels. In the event the test pixel is not green, the processor can do further processing with the one or more methods associated with the non-green pixels.

At decision block 206, the processor determines if the test pixel is a defective pixel. If the test pixel is a defective pixel, the processor generates a corrected sensor value for the test pixel at process block 208. The processor performs decision block 210 after generating the corrected value and after determining that the test pixel is not a defective pixel. At decision block 210, the processor determines whether each of the pixels that are to be considered a test pixel has been considered a test pixel. In the event that each of the pixels that are to be considered a test pixel has not been considered a test pixel, the processor returns to process block 202. When returning to process block 202 to consider additional test pixels, the processor does not substitute the corrected sensor values for the original sensor values and proceeds using the original sensor values. When each of the pixels to be considered a test pixel has been considered a test pixel, the processor replaces the sensor values of each of the defective pixels with the corrected sensor values at process block 212. The processor can then store the results in the memory and/or output the sensor values to one or more of the output devices. Alternately, the processor can further process the corrected sensor values before storing the sensor values in the memory and/or outputting the processed sensor values to one or more output devices. Examples of further processing of the corrected sensor values include, but are not limited to, demosaicing and compression using a compression method (not shown), such as the JPEG standard.

Figure 2B:
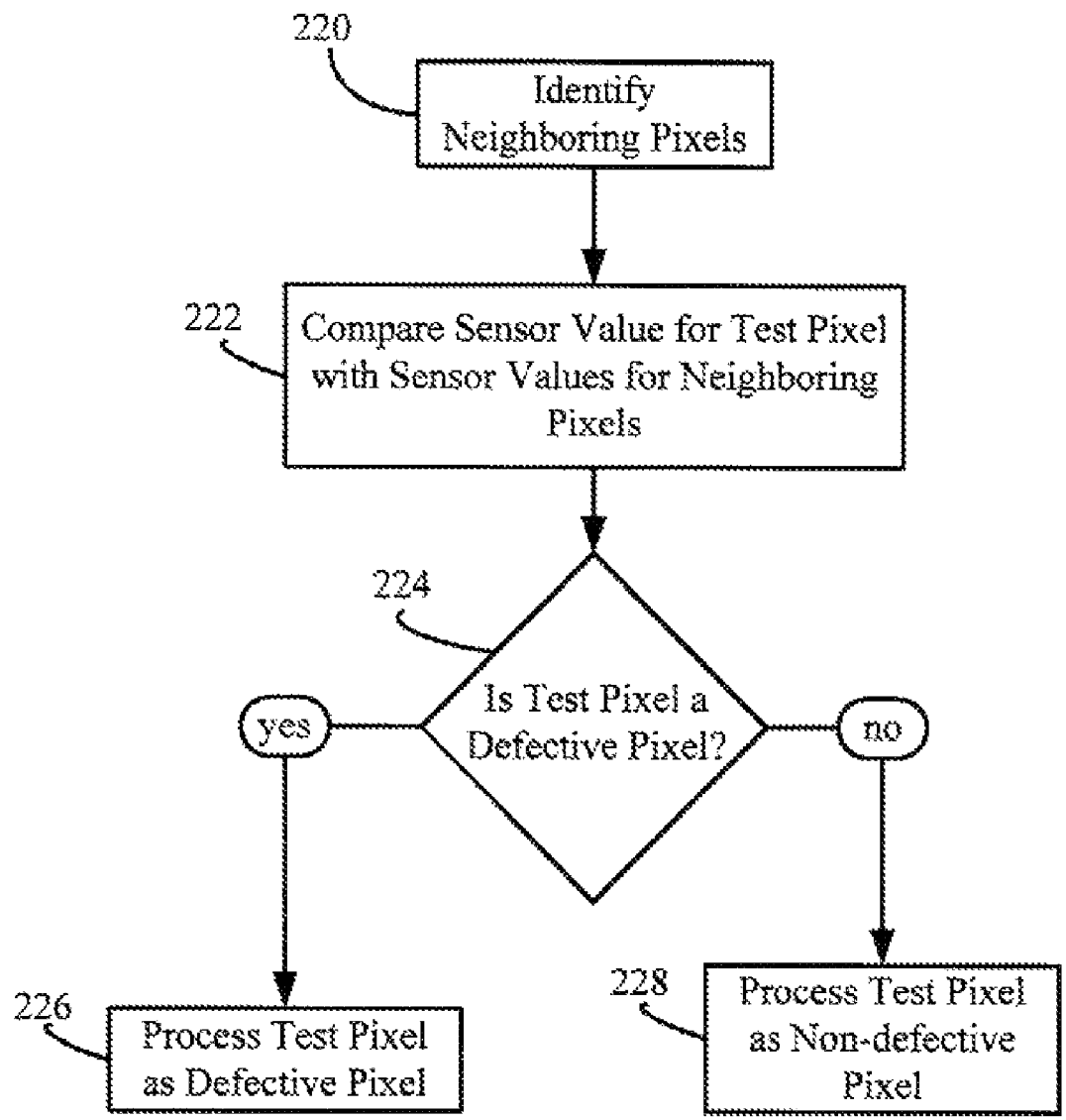
FIG. 2B is a flow diagram illustrating an exemplary method of determining whether a test pixel is a defective pixel where none of the pixels immediately adjacent to a test pixel are the same color as the test pixel.
Figure 2C:
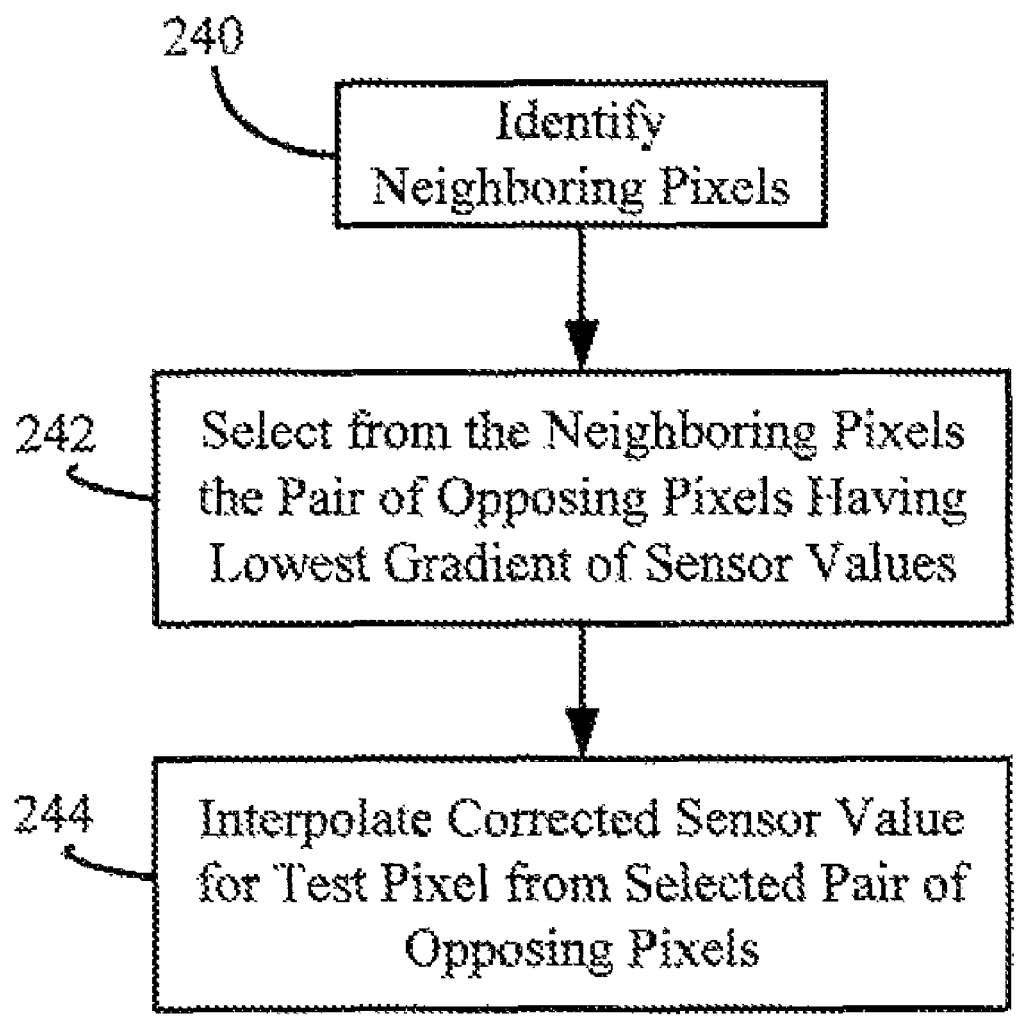
FIG. 2C is a flow diagram illustrating an exemplary method of determining the corrected sensor value for a defective pixel where none of the pixels immediately adjacent to a test pixel are the same color as the test pixel.
Figure 2D:
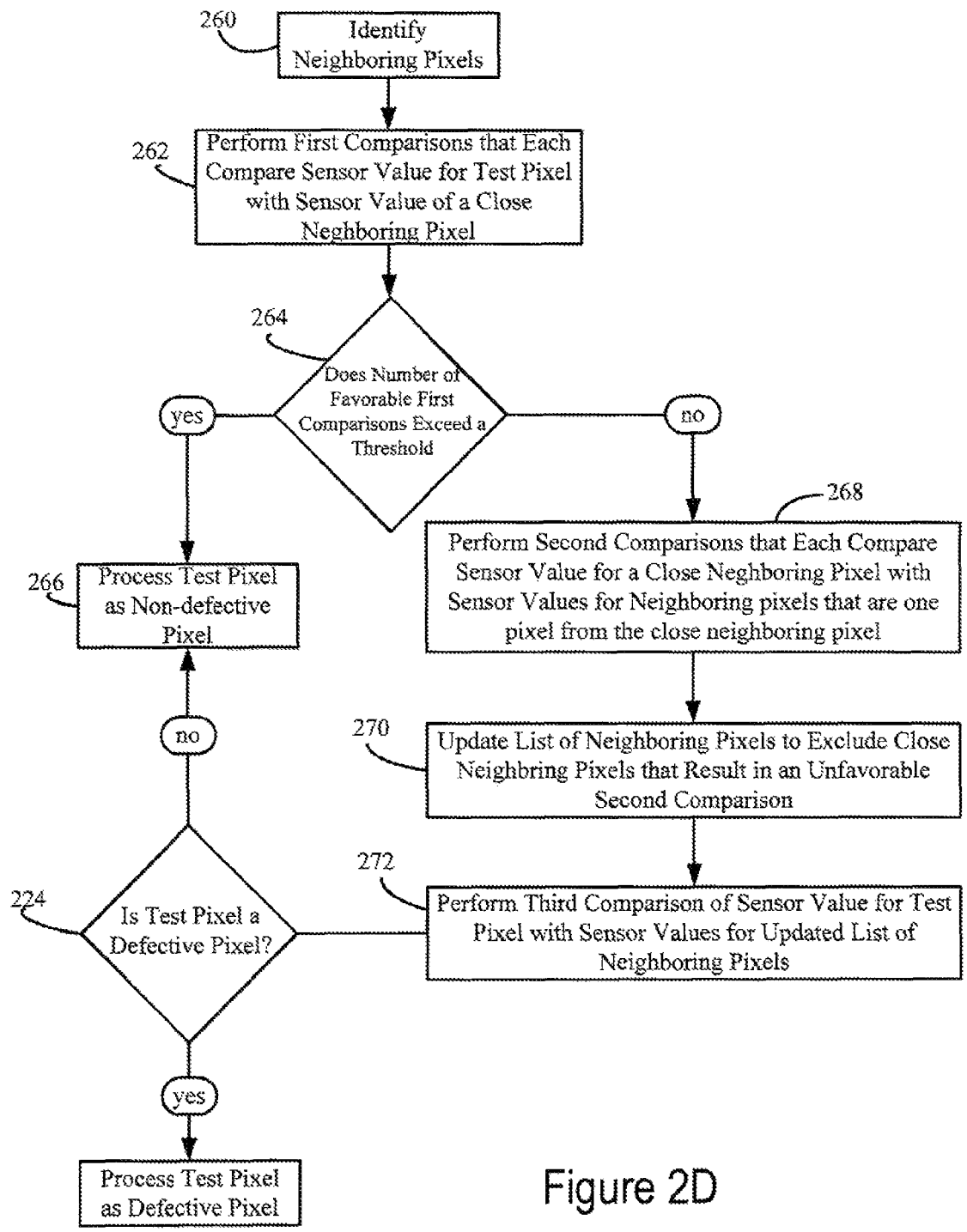
FIG. 2D is a flow diagram illustrating an exemplary method of determining whether a pixel is a defective pixel where a portion of the pixels immediately adjacent to a test pixel are the same color as the test pixel.

FIG. 2B and FIG. 2D are flow diagrams for methods of determining if a pixel is a defective pixel. Each method makes use of pixel integrity tests. Each pixel integrity test compares the sensor value of a trial pixel to the sensor values of comparison pixels. For instance, the pixel integrity test can compare the sensor value of the trial pixel to a range of values that is a function of sensor values of the comparison pixels. In some instances, the comparison compares the sensor value of the trial pixel (TP) to a range of values that is a function of the maximum sensor values of the comparison pixels ($CP_{max}$) and/or of the minimum sensor value of the comparison pixels ($CP_{min}$) while excluding the sensor values of the other comparison pixels. For instance, the processor can determine if TP is between $CP_{max}F_{max}$ and $CP_{min}F_{min}$, where $F_{max}$ and $F_{min}$ are constants set by a manufacturer or technician or they can be variables that are varied by the processor where. In general $F_{max}>1.0>F_{min}$. In an example comparison, the processor determines if $CP_{min}F_{min}<TP<CP_{max}F_{max}$. This comparison excludes the sensor values for pixels other than the pixels associated with the maximum sensor value and the pixels associated with the minimum sensor value. In general, TP falling outside of the exemplary range indicates that the trial pixel is a defective pixel or has the potential to be a defective pixel. For instance, a TP above $CP_{max}F_{max}$ indicates that the trial pixel may be what is commonly called a hot pixel. A TP below $CP_{min}F_{min}$, indicates that the trial pixel may be what is commonly called a cold pixel. TP falling inside of the exemplary range indicates that the trial pixel is a non-defective pixel or has the potential to be a non-defective pixel. Accordingly, the sensor value for the trial pixel compares favorably with the comparison pixels when TP is between $CP_{max}F_{max}$ and $CP_{min}F_{min}$ but does not compare favorably when TP is below $CP_{min}F_{min}$ or above $CP_{max}F_{max}$. The range comparison described above can also be made by comparison to two different ranges, for instances, it could first be determined if TP is below $NP_{min}F_{min}$ and then subsequently determined if TP is above $NP_{max}F_{max}$.

As is evident from the above discussion, $F_{max}$ and $F_{min}$ determine the tolerance for variations in pixel intensity. Accordingly, reducing the level of $F_{max}$ and/or increasing the level of $F_{min}$ will increase the number of defective pixels by decreasing the range of values against which TP is compared and increasing the odds or probability that a test pixel will fall outside of the range. Increasing the level of $F_{max}$ will decrease the number of defective pixels and/or reducing the level of $F_{min}$ will decrease the number of defective pixels by increasing the range of values against which TP is compared and increasing the odds or probability that a test pixel will fall outside of the range. As a result, the processor can control the number of defective pixels that will be identified by varying $F_{max}$ and/or $F_{min}$. The value of $F_{max}$ and/or $F_{min}$ can be varied in response to changing conditions under which an image is generated. The value of $F_{max}$ and/or $F_{min}$ can be determined before an image is generated and stored. For instance, when the imaging system is a camera, the value of $F_{max}$ and/or $F_{min}$ can be determined when the camera is in preview mode. When the camera is in preview mode, images are displayed to the user on a display but are not stored in a memory. During this time, the disclosed methods can be performed to determine the number of bad pixels that are being generated. The value of $F_{max}$ and/or $F_{min}$ can be adjusted so as to achieve the desired number of defective pixels.

FIG. 2B is a flow diagram illustrating a method of determining whether a test pixel is a defective pixel. The method is appropriate for when none of the pixels that are immediately adjacent to the test pixel are the same color as the test pixel. For instance, when a Bayer pattern is employed, the disclosed method is appropriate for when the test pixel is blue or red. The method is suitable for use in conjunction with decision block 206 of FIG. 2A.

At process block 220, the processor identifies each of the pixels that are one or two pixels from the test pixel and the same color as the test pixel. The identified pixels are treated as the neighboring pixels. For instance, when the test pixel is $R_5$, the neighboring pixels are $R_1$, $R_2$, $R_3$, $R_4$, $R_6$, $R_7$, $R_8$, and $R_{10}$.

At process block 222, the processor performs a pixel integrity test on the test pixel by comparing the sensor value of the test pixel to the sensor values for each of the neighboring pixels. For instance, the processor performs the pixel integrity test by treating the test pixel as the trial pixel and by treating the neighboring pixels as the comparison pixels. Accordingly, the processor can determine if TP is between $CP_{max}F_{max}$ and $CP_{min}F_{min}$. As an example when the test pixel is $R_5$ in the above Bayer Pattern, the processor determines if $39*F_{min}<TP<473*F_{max}$. At decision block 224, the processor determines if the test pixel is a non-defective pixel or a defective pixel. In the event that TP is outside of the range, the test pixel is processed as defective pixel at process block 226. In the event that TP is inside the range, the test pixel is processed as a non-defective pixel at process block 228. When TP is above $NP_{max}F_{max}$, the pixel is what is commonly called a hot pixel. When TP is below $NP_{min}F_{min}$, the pixel is what is commonly called a cold pixel.

FIG. 2C is a flow diagram illustrating a method of determining the corrected sensor value for a defective pixel. The method is appropriate for when none of the pixels that are immediately adjacent to the test pixel are the same color as the test pixel. For instance, when a Bayer pattern is employed, the disclosed method is appropriate for when the test pixel is blue or red. The method is suitable for use in conjunction with decision block 208 of FIG. 2A.

At process block 240, the processor identifies the neighboring pixels. The neighboring pixels may have been previously identified during execution of process block 220 of FIG. 2B. At process block 242, the processor identifies the opposing pair of neighboring pixels that are associated with the lowest change in the sensor values, i.e. the lowest gradient in sensor values. The pixels in a pair of opposing pixels are positioned on opposing sides of the defective pixel, are located at most two pixels away from the defective pixel, and are the same color as the defective pixel. Accordingly, each pair of opposing neighboring pixels is positioned on a different line through the center of the test pixel. The change in the sensor value for an opposing pair of neighboring pixels is the absolute value of the difference between the sensor values associated with each pixel in the pair. As a result, when the test pixel is $R_5$, the pixels $R_2$ and $R_8$ in the above Bayer pattern would be identified.

At process block 244, the process interpolates between the sensor values for the identified pair of opposing pixels and employs the result as the corrected sensor value for the test pixel. Since each of pixel in the identified pair is two pixels from the test pixel, the interpolation is an average of the sensor values for the identified pair. As a result, the corrected sensor value is not a function of pixels other than the pixels in the identified pair. As an example, the corrected sensor value for test pixel is $R_5$ is 163. The use of the opposing pair associated with the lowest gradient in sensor values can compensate for defective pixels located at the edge of a feature in the image. The pixels at an edge of a feature in an image will often have a non-linear change in the sensor value from a pixel of one color to the next pixel of the same color. As a result, the correct value for a pixel and the average for an opposing pairs of pixels can be very different. However, the difference between the average value of an opposing pairs and the non-linear change that can result from the pixels being near and edge will be the smallest when the gradient between the opposing pair of pixels is minimized. Accordingly, the average of the sensor values for the opposing pair associated with the smallest gradient in sensor values will most closely approximate the correct value even when the pixel is positioned at an edge of a feature in the image.

FIG. 2D is a flow diagram illustrating a method of determining whether a pixel is a defective pixel. The method is appropriate for when a portion of the pixels immediately adjacent to the test pixel are the same color as the test pixel. For instance, when a Bayer pattern is employed, the disclosed method is appropriate for when the test pixel is green. The method is suitable for use in conjunction with decision block 206 of FIG. 2A.

At process block 260, the processor identifies each of the pixels that are one or two pixels from the test pixel and the same color as the test pixel. The identified pixels are the neighboring pixels. For instance, when the test pixel is $G_8$, the neighboring pixels are $G_1$, $G_2$, $G_3$, $G_4$, $G_5$, $G_7$, $G_9$, $G_{10}$, $G_{11}$, $G_{13}$, $G_{14}$, and $G_{15}$. The neighboring pixels that are one pixel from the test pixels are close neighboring pixels. The neighboring pixels that are two pixels from the test pixels are remote neighboring pixels. For instance, when the test pixel is $G_8$, the close neighboring pixels are $G_4$, $G_5$, $G_{10}$, and $G_{11}$ and the remote neighboring pixels are $G_1$, $G_2$, $G_3$, $G_7$, $G_9$, $G_{13}$, $G_{14}$, and $G_{15}$.

At process block 262, the processor performs a plurality of pixel integrity tests. Each pixel integrity test includes a first comparison of the sensor value of the test pixel to the sensor value for a close neighboring pixel. The pixel integrity tests can be performed by treating the test pixel as the trial pixel and by treating the close neighboring pixel as the comparison pixels. Since only one pixel serves as the comparison pixel, $CP_{max}=CP_{min}=CP$. Accordingly, the processor can determine if TP is between $CP*F_{max}$ and $CP*F_{min}$. As an example, when the test pixel is $G_8$ and the close neighboring pixel is $G_4$, the processor determines if $200*F_{min}<G_8<F_{max}*200$. When TP is outside of the range, the test pixel is designated a potentially defective pixel. When TP is inside the range, the test pixel is designated a potentially non-defective pixel. The pixel integrity test can be performed for each of the close neighboring pixels and the number of times that the pixel is designated a potentially non-defective pixel can be counted.

At decision block 264, the processor determines whether the number of favorable first comparisons exceeds a threshold. For instance, when the number of potentially non-defective pixel designations rises above some threshold, the test pixel is processed as a non-defective pixel at process block 266. In the event that the number of potentially non-defective pixel designations meets or falls below the threshold, the process proceeds to process block 268. A suitable threshold for use with a Bayer pattern is 1. This process permits the test pixel to be designated a non-defective pixel when the sensor value for the test pixel is close to the sensor value for a portion of the close neighboring pixels. As a result, if one or more of the close neighboring pixels is a defective pixel, this result will not prevent the test pixel from being designated a non-defective pixel. Accordingly, the method permits the test pixel to be included in a defective pixel cluster as large as 2 pixels by 2 pixels without affecting the quality of the result.

When the number of favorable first comparisons meets or falls below the threshold, the processor performs a plurality of pixel integrity tests at process block 268. Each pixel integrity test is a second comparison of the sensor value of a close neighboring pixel to the sensor values of the neighboring pixels that are one pixel from the close neighboring pixel. For instance, when the test pixel is $G_8$ and the close neighboring pixel is $G_4$, the pixel integrity test compares the sensor value of $G_4$ to the sensor values of $G_1$, $G_2$, and $G_7$. The pixel integrity tests can be performed by treating the close neighboring pixel as the trial pixel and by treating the neighboring pixels that are one pixel from the close neighboring pixel as comparison pixels. Accordingly, the second comparisons exclude the test pixel. As a result, the processor can determine if TP is between $CP_{max}*F_{max}$ and $CP_{min}*F_{min}$. As an example, when the test pixel is $G_8$ and the close neighboring pixel is $G_4$, the processor determines if $81*F_{min} < G_4 < 162*F_{max}$. When TP is outside of the range, the close neighboring pixel is designated a potentially defective pixel. The pixel integrity test can be performed for each of the close neighboring pixels. The list of neighboring pixels is updated at process block 270 such that the close neighboring pixels designated as potentially defective pixels at process block 268 are removed from the list of neighboring pixels. For instance, if $G_{11}$ is the only close neighboring pixel designated as a potentially defective pixel, the list of neighboring pixels would be adjusted to include only $G_1$, $G_2$, $G_3$, $G_4$, $G_5$, $G_7$, $G_9$, $G_{10}$, $G_{13}$, $G_{14}$, and $G_{15}$.

At process block 272, the processor performs a pixel integrity test on the test pixel. The pixel integrity test is a third comparison of the sensor value of the test pixel to the sensor values for each of the neighboring pixels in the list of neighboring pixels generated at process block 270. For instance, the processor performs the pixel integrity test by treating the test pixel as the trial pixel and by treating the neighboring pixels as the comparison pixels. Accordingly, the processor can determine if TP is between $CP_{max}F_{max}$ and $CP_{min}F_{min}$. As an example, when the test pixel is $G_8$ and $G_{11}$ is the only close neighboring pixel designated as a potentially defective pixel, the processor determines if $43*F_{min} < TP < 202*F_{max}$. At decision block 274, the processor determines if the test pixel is a non-defective pixel or a defective pixel. In the event that TP is outside of the range, the test pixel is processes as a defective pixel at process block 276. In the event that TP is inside the range, the test pixel is processed as a non-defective pixel at process block 266. When TP is above $NP_{max}F_{max}$, the pixel is what is commonly called a hot pixel. When TP is below $NP_{min}F_{min}$, the pixel is what is commonly called a cold pixel or a cool pixel.

The exemplary methods for identifying defective pixels do not employ interpolation between the sensor values of pixels. Excluding interpolation from the process of identifying defective pixels can reduce the amount of error introduced into the results.

Figure 2E:
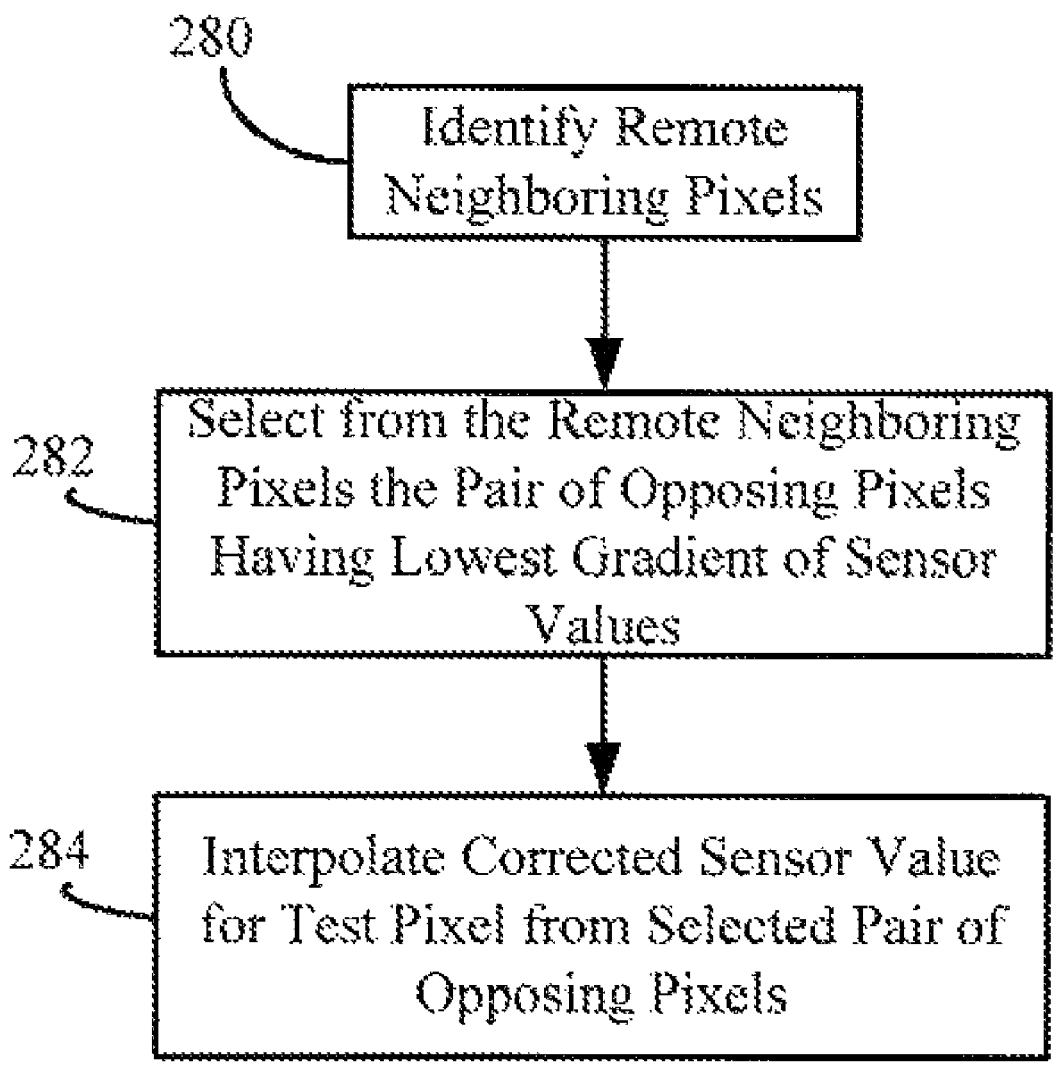
FIG. 2E is a flow diagram illustrating an exemplary method of determining a corrected sensor value for a defective pixel where a portion of the pixels immediately adjacent to a test pixel are the same color as the test pixel.

FIG. 2E is a flow diagram illustrating a method of determining a corrected sensor value for a defective pixel. The disclosed method is appropriate for when a portion of the pixels immediately adjacent to the test pixel are the same color as the test pixel. For instance, when a Bayer pattern is employed, the disclosed method is appropriate for when the test pixel is green. The method is suitable for use in conjunction with decision block 208 of FIG. 2A.

At process block 280, the processor identifies the remote neighboring pixels. The remote neighboring pixels are pixels that are that are two pixels from the test pixels and are the same color as the test pixel. The remote neighboring pixels may have been previously identified during execution of process block 260 in FIG. 2D. At process block 282, the processor identifies the opposing pair of remote neighboring pixels that are associated with the lowest change in the sensor values, i.e. the lowest gradient in sensor values. The pixels in an opposing pair of remote neighboring pixels are positioned on opposing sides of the defective pixel, are located two pixels away from the defective pixel, and are the same color as the defective pixel. As a result, each opposing pair is positioned on a different line through the center of the test pixel. The change in the sensor value for an opposing pair is the absolute value of the difference between the sensor values associated with each pixel in the pair. As a result, when the test pixel is $G_8$, the pixels $G_3$ and $G_{13}$ in the above Bayer pattern would be identified.

At process block 284, the process interpolates between the sensor values for the identified opposing pair and employs the result as the corrected sensor value for the test pixel. Since each pixel in the identified pair is two pixels from the test pixel, the interpolation is an average of the sensor values for the identified pair. As a result, the corrected sensor value is not a function of pixels other than the pixels in the identified pair. As an example, when the test pixel is $G_8$, the corrected sensor value is 100. The use of the opposing pair associated with the lowest gradient in sensor values can compensate for defective pixels located at the edge of a feature in the image. The pixels at an edge of a feature in an image will often have a non-linear change in the sensor value from a pixel of one color to the next pixel of the same color. As a result, the correct value for a pixel and the average for an opposing pairs of pixels can be very different. However, the difference between the average value of an opposing pairs and the non-linear change that can result from the pixels being near and edge will be the smallest when the gradient between the opposing pair of pixels is minimized. Accordingly, the average of the sensor values for the opposing pair associated with the smallest gradient in sensor values will most closely approximate the correct value even when the pixel is positioned at an edge of a feature in the image.

The process blocks and decision blocks described above can be performed in a sequence other than the presented sequence. For instance, the first comparisons disclosed in the context of process block 262 can be performed concurrently with the second comparisons disclosed in the context of process block 268. Alternately, the first comparisons can be performed after the second comparisons. As a result, the terms first, second, and third that modify comparisons are employed to distinguish different comparisons rather than to indicate sequence.

Figure 3:
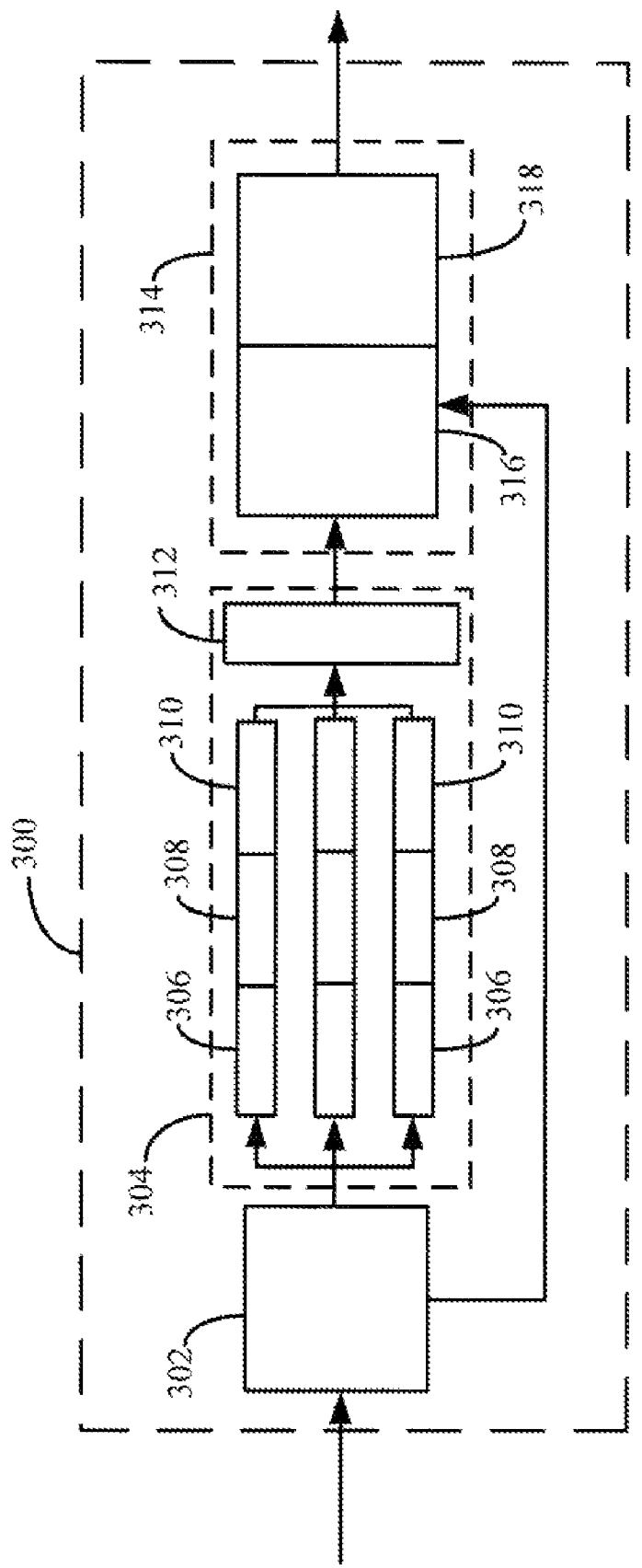
FIG. 3 is a logic flow diagram illustrating logic modules for processing sensor values from an image sensor in accordance with the exemplary embodiment.

FIG. 3 is a logic flow diagram showing logic modules for processing sensor values from an image sensor. The electronics 300 include a buffer 302 for receiving sensor values generated by an image sensor. The electronics include an identification module 304 that receives the sensor values from the buffer. The identification module 304 processes the sensor values to identify defective pixels. For instance, the identification module 304 can process the sensor values in accordance with FIG. 2B and/or FIG. 2D.

The identification module 304 includes one or more pixel selection modules 306 that receive data from the buffer 300. The pixel selection modules each select a test pixel to serve as a trial pixel and the comparison pixels needed to perform a pixel integrity test. The identification module 304 also includes one or more range modules 308 that each employ the comparison pixels selected in a pixel selection module 306 to determine a range of sensor values. The identification module 304 also includes one or more comparison modules 310 that each receive data from a range module 306. The comparison modules 310 compare sensor values for the trial pixel to the range generated in a range module. The identification module also includes a diagnostics module 312 that receives the results from each comparison module 308 and employs these results to determine if the test pixel is defective.

Although the combinations of pixel selection modules 306, range modules 308 and comparison modules 310 are shown as being arranged in parallel, they can be arranged in series. For instance, as noted above, portions of the first comparison, the second comparison and the third comparison of FIG. 2D can be performed in parallel or in series. Alternately, the same pixel selection module 306, range module 308 and comparison module 310 can be employed to perform more than one of the comparisons. For instance, a single pixel selection module 306, range module 308 and comparison module 310 can be employed to perform each of the first, second, and third comparisons as well as the comparison in FIG. 2B. As a result, the electronics can include only one pixel selection module 306, one range module 308 and one comparison module 310.

The number of pixel selection modules 306 that receive data from the buffer can be a function of the method being performed by the identification module. For instance, electronics operating in accordance with FIG. 2B may require only one pixel selection module 306. However, electronics operating in accordance with FIG. 2D may require as many three pixel selection modules 306.

The electronics include a correction module 316. In the event that the diagnostics module 312 determines a test pixel to be a defective pixel, the correction module 316 employs sensor values from the buffer to generate a corrected sensor value for the test pixel. For instance, the correction module 316 can process the sensor values in accordance with FIG. 2C and/or FIG. 2E. The correction module 316 includes an identification module 318 for identifying the pair of opposing pixels associated with the lowest gradient in sensor values. The correction module 316 also includes an interpolation module 320 for interpolation between the identified pair of opposing pixels so as to generate the corrected pixel value.

Although the above disclosure is frequently provided in the context of an image sensor having pixels arranged in a Bayer pattern, the methods can be employed in conjunction with image sensors having other colors, the same colors arranged in different patterns, and/or pixels in spatial arrangements other than rows and columns.

Those of skill in the art would understand that information and signals may be represented using any of a variety of different technologies and techniques. For example, data and instructions that may be referenced throughout the above description may be represented by voltages, currents, electromagnetic waves, magnetic fields or particles, optical fields or particles, or any combination thereof.

Those of skill would further appreciate that the various illustrative logical blocks, circuits, and method steps described in connection with the embodiments disclosed herein may be implemented as electronic hardware, computer software, or combinations of both. To clearly illustrate this interchangeability of hardware and software, various illustrative components, blocks, logic, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, logic, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable medium known in the art. An exemplary storage computer-readable medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An imaging system configured to generate a corrected sensor value associated with a defective pixel of an image sensor based on a plurality of sensor values selected from a group of sensor values associated with pixels spatially positioned in at least two dimensions on the image sensor, the imaging system comprising:
    a buffer for receiving sensor values, each sensor value associated with a pixel in the image sensor, at least one of the sensor values being associated with the defective pixel;
    electronics for selecting sensor values associated with a pair of opposing pixels from among a group of sensor values, the group of sensor values being associated with pixels spatially positioned in at least two dimensions on the image sensor, the pair of opposing pixels being positioned within two pixels of the defective pixel and on opposing sides of the defective pixel, and wherein the pair of opposing pixels are the same color as the defective pixel; and
    electronics for generating the corrected sensor value to be associated with the defective pixel, the corrected sensor value being a function of the sensor values associated with the opposing pair of pixels.

2. The imaging system of claim 1, wherein the selected pair of opposing pixels are each located two pixels away from the defective pixel.

3. The imaging system of claim 1, wherein the corrected sensor value is not a function of sensor values other than the sensor values associated with the selected pair of opposing pixels.

4. The imaging system of claim 1, wherein generating the corrected sensor value includes interpolating between the selected sensor values.

5. The imaging system of claim 1, wherein the selected pair of opposing pixels is one of a plurality of opposing pairs of pixels of the same color as the defective pixel included in the group of sensor values, and the selected pair of opposing pixels is associated with sensor values that are closer to one another than sensor values associated with the one or more unselected pairs of opposing pixels of the plurality of opposing pixel pairs.

6. An imaging system, comprising:
 means for receiving sensor values, each sensor value associated with a pixel in the image sensor, at least one of the sensor values being associated with the defective pixel; and
 means for selecting sensor values associated with a pair of opposing pixels from among a group of sensor values associated with opposing pairs of two pixels of the same color as the defective pixel, each of the opposing pixel pair positioned within two pixels of the defective pixel and on opposing sides of the defective pixel, the pair of opposing pixels having the lowest gradient in associated sensor values of the opposing pairs of two pixels; and
 means for generating the corrected sensor value to be associated with the defective pixel, the corrected sensor value being a function of the sensor values associated with the selected pair of opposing pixels.

7. The imaging system of claim 6, wherein each pixel of the selected pair of opposing pixels is located two pixels away from the defective pixel.

8. The imaging system of claim 6, wherein the corrected sensor value is not a function of sensor values other than the sensor values associated with the selected pair of opposing pixels.

9. A non-transitory computer-readable storage medium storing a set of computer-executable instructions, that when executed perform a method, the method comprising:
 receiving sensor values that are each associated with a pixel in an image sensor, at least one of the sensor values being associated with a defective pixel;
 selecting sensor values from among a group of sensor values associated with a pair of opposing pixels, the group of sensor values being associated with pixels spatially positioned in at least two dimensions on the image sensor, the pair of opposing pixels being positioned on opposing sides of the defective pixel and within two pixels of the defective pixel, and the pair of opposing pixels both being the same color as the defective pixel; and
 generating a corrected sensor value to be associated with the defective pixel, the corrected sensor value being a function of the selected sensor values.

10. The non-transitory computer-readable storage medium of claim 9, wherein the non-transitory computer-readable storage medium comprises at least one of a hard disk, a removable disk, and a CD-ROM.

11. The non-transitory computer-readable storage medium of claim 9, wherein the selected pair of opposing pixels has the lowest gradient in associated sensor values of opposing pixel pairs, wherein each opposing pair is two pixels of the same color as the defective pixel that are positioned within two pixels of the defective pixel on opposing sides of the defective pixel.

12. A mobile camera phone, comprising:
 a buffer for receiving sensor values that are each associated with a pixel in an image sensor, at least one of the sensor values being associated with a defective pixel;
 electronics for selecting a pair of opposing pixels from among a plurality of pairs of opposing pixels,
  the pixels in a pair of opposing pixels being positioned on opposing sides of the defective pixel, being located at most two pixels away from the defective pixel, and being of the same color as the defective pixel,
  the selected pair of opposing pixels being associated with sensor values that are closer to one another than sensor values associated with the one or more unselected pairs of opposing pixels; and
 electronics for interpolating between the selected pair of opposing pixels to generate a corrected sensor value to be associated with the defective pixel.

13. The mobile camera phone of claim 12, wherein the corrected sensor value is not a function of sensor values other than the sensor values associated with the selected pair of opposing pixels.

14. The mobile camera phone of claim 12, wherein each pixel of the selected pair of opposing pixels is located two pixels away from the defective pixel.

15. A method of correcting sensor values associated with a defective pixel, comprising:
 receiving sensor values that are each associated with a pixel in an image sensor, at least one of the sensor values being associated with a defective pixel;
 selecting a plurality of sensor values from among a group of sensor values associated with a pair of opposing pixels, the group of sensor values being associated with pixels spatially positioned in at least two dimensions on the image sensor, the pair of opposing pixels being positioned on opposing sides of the defective pixel and within two pixels of the defective pixel, and the pair of opposing pixels both being the same color as the defective pixel; and
 generating a corrected sensor value to be associated with the defective pixel, the corrected sensor value being a function of the selected sensor values.

16. The method of claim 15, wherein generating the corrected sensor value is not based on sensor values other than the sensor values associated with the selected pair of opposing pixels.

17. The method of claim 15, wherein selecting a plurality of sensor values includes selecting the pair of opposing pixels having the lowest gradient in associated sensor values of opposing pixel pairs, wherein each opposing pair is two pixels of the same color as the defective pixel that are positioned within two pixels of the defective pixel on opposing sides of the defective pixel.

* * * * *